July 26, 1949.　　　　K. L. PECK　　　　2,477,265
MOORING DEVICE
Filed Sept. 18, 1947
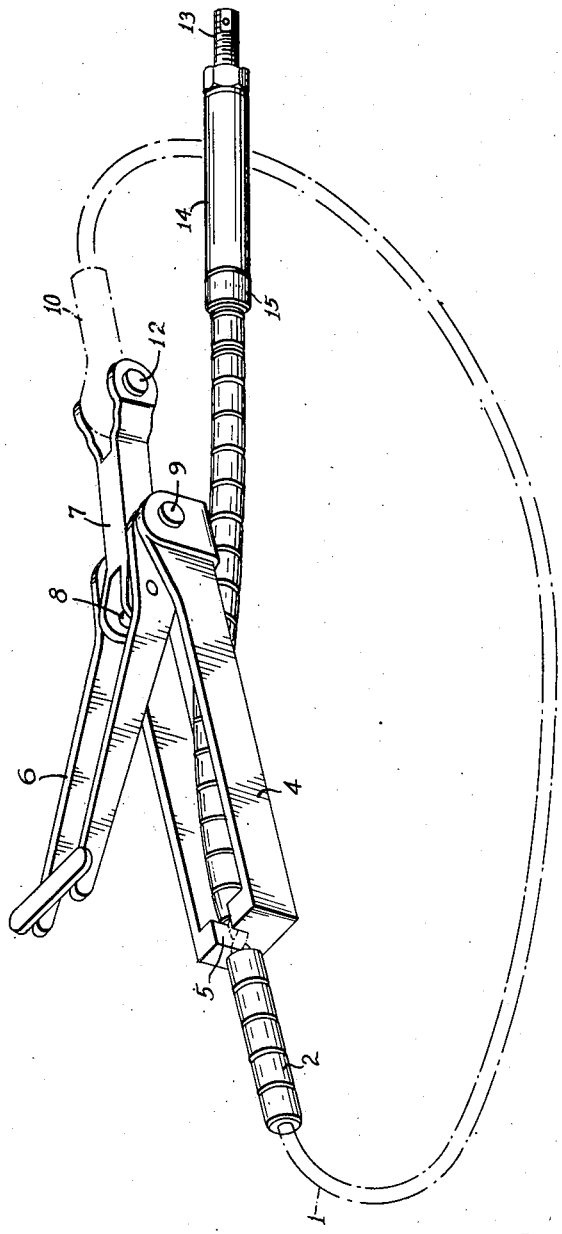
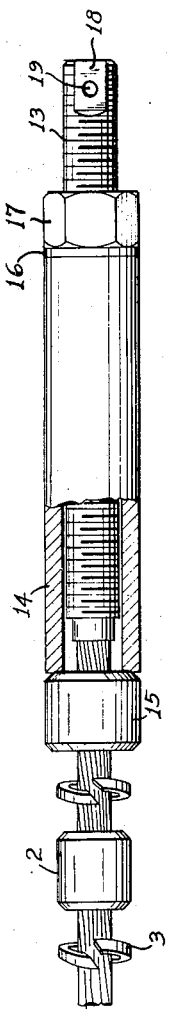
INVENTOR
KENNETH L. PECK
BY
Dennis, Edmonds, Morton and Barrows
ATTORNEYS Patented July 26, 1949

2,477,265

UNITED STATES PATENT OFFICE 2,477,265

MOORING DEVICE

Kenneth L. Peck, Pleasantville, N. Y.

Application September 18, 1947, Serial No. 774,706

4 Claims. (Cl. 24—115)

This invention relates generally to a take-up mechanism and more particularly to a take-up device for use on mooring lines or securing lines of any type.

In the copending application of Reinhold F. Balmer and me, filed July 25, 1946, Serial No. 686,098, Patent No. 2,472,026, May 31, 1949 under the provisions of the act of March 3, 1883 (35 U. S. C. §45) we have disclosed and claimed a mooring device consisting of a yoke, a toggle lever pivoted on the yoke and a cable adapted to be secured in adjusted position by the yoke and lever, the cable having a plurality of spacers thereon between any two of which the yoke is secured to adjust the length of the cable.

In the use of this device I have found that in some instances, after the mooring device is adjusted, the cable is not sufficiently taut and it is then necessary to release the toggle lever and again secure the mooring line to get it as tight as desired. The present invention is directed to means for tightening the cable after the mooring device has been secured, thus eliminating the necessity of releasing the device and readjusting it.

In carrying out the invention, I provide a take-up device on the end of the cable by means of which the position of the spacer in engagement with the yoke can be varied. Thus, after preliminary adjustment of the mooring lines and closure of the toggle lever, any slack remaining in the cable can be taken up without releasing the toggle lever.

In the accompanying drawing I have shown one embodiment of the invention. In this showing:

Fig. 1 is a perspective view of a securing line showing the invention applied; and Fig. 2 is an enlarged view of the end of the cable to which the take-up device is secured.

Referring to the drawing the reference numeral 1 designates a cable having a plurality of spacers 2 slidably mounted thereon adjacent one end. The spacers are in the form of sleeves or collars of a size to fit on the cable. Between each pair of spacers I place a spring lock washer 3 which creates a spring tension to keep the lashing taut when the device is in use. The end of the cable having the spacers is adapted to be secured in a yoke 4 which, as shown, may be provided with a substantially U-shaped slot 5 at one end. The slot is of such size that the cable itself can slide through it but is too small for passage of the spacers 2. A toggle lever 6 is pivoted to the yoke at a point remote from the slot 5 and may be pivoted, as illustrated at 9, at the other end of the yoke. A link 7 is in turn pivotally connected to the toggle lever, as illustrated at 8, at a point spaced from the pivot. A cable fitting 10 is connected to the link by a pin 12 and if the device is employed as a securing line, as illustrated in the drawing, the cable 1 is connected to the fitting 10. When employed as a mooring device to secure aircraft on the deck of a carrier or at an air field, a separate line may be connected to the fitting 10 and this line and the line 1 may be provided with fittings at their ends to be secured to suitable fastening means.

The take-up device is illustrated in greater detail in Fig. 2 of the drawing. As shown, a threaded sleeve 13 is swaged on the end of the cable 1 and this sleeve is surrounded by a tube or collar 14 whose internal diameter is greater than that of the sleeve. The inner end of the collar is engaged by an end spacer 15 of larger diameter than the remaining spacers 2, and of substantially the same diameter as that of the sleeve. The end spacer thus abuts the end 15 of the collar. The collar is placed over the end of the cable before the sleeve 13 is swaged on to the cable. After the sleeve has been placed in position, a washer 16 is placed at the outer end of the collar 14 and a nut 17 screwed on to the sleeve to hold the collar in place. The end of the sleeve may be provided with two oppositely positioned flattened portions 18 to receive a wrench and may also be provided with an opening 19 to receive a pin or bar to permit adjustment.

In the operation of the device, if used as a mooring line, the cables are secured to suitable supports and the end of cable 1 carrying the spacers 2 is fed through the yoke to an adjustment which will make it relatively tight. The toggle lever 6 is then swung on its pivot to a closed position. This movement of the toggle lever moves link 7 around the pivot 9 and draws the fitting 10 and the end of the cable tighter to take up remaining slack. If further tightening is necessary, turning the end of the cable moves the collar 14 on the sleeve 13 and thus positions the end spacer 2 a further distance from the end of the cable. Any slackness remaining in the device after initial adjustment by the toggle lever can be taken up in this way, thus eliminating the necessity of releasing the toggle lever and adjusting the cable to bring the yoke into a different position with respect to the cable.

The device may be readily released by swinging the toggle lever to an open position, thus producing enough slack in the mooring to permit the cable 1 to be readily removed from the slot 5.

I claim:

1. A mooring device comprising a cable, spacers slidably mounted on the cable adjacent one end, a yoke to receive the cable between two of said spacers, a toggle lever pivoted on the yoke, means for connecting a cable to the lever at a point spaced from the pivot of the toggle lever, a collar mounted on the end of the cable in contact with the end spacer, and means for adjusting the position of the collar.

2. A mooring device comprising a cable, spacers slidably mounted on the cable adjacent one end, a yoke to receive the cable between two of said spacers, a toggle lever pivoted on the yoke, means for connecting a cable to the lever at a point spaced from the pivot of the toggle lever, and spring washers arranged on the cable between each pair of spacers.

3. A mooring device comprising a cable, spacers slidably mounted on the cable adjacent one end, a yoke to receive the cable between two of said spacers, a toggle lever pivoted on the yoke, means for connecting a cable to the lever at a point spaced from the pivot of the toggle lever, a collar mounted on the end of the cable in contact with the end spacer, a threaded sleeve secured to the end of the cable, and a nut on the sleeve engaging the outer end of the collar.

4. A mooring device comprising a cable, spacers slidably mounted on the cable adjacent one end, a yoke to receive the cable between two of said spacers, a toggle lever pivoted on the yoke, means for connecting a cable to the lever at a point spaced from the pivot of the toggle lever, a collar mounted on the end of the cable in contact with the end spacer, a threaded sleeve secured to the end of the cable, a nut on the sleeve engaging the outer end of the collar, and means for turning the sleeve to adjust the position of the nut and the collar.

KENNETH L. PECK.

REFERENCES CITED

The following references are of record in the file of this patent:

UNITED STATES PATENTS

| Number | Name | Date |
|---|---|---|
| 1,078,809 | Thomas | Nov. 18, 1913 |
| 1,410,770 | Silverman et al. | Mar. 28, 1922 |
| 2,100,666 | Muller | Nov. 30, 1937 |
| 2,181,794 | Schlytter | Nov. 28, 1939 |
| 2,216,662 | Eisenhoer | Oct. 1, 1940 |